US012609833B2

(12) United States Patent　　　(10) Patent No.:　US 12,609,833 B2
　　Völcker et al.　　　　　　　　　(45) Date of Patent:　Apr. 21, 2026

(54) SIGNING VIDEO FOR REDUCED BIT RATE

(71) Applicant: Axis AB, Lund (SE)

(72) Inventors: Björn Völcker, Lund (SE); Stefan Lundberg, Lund (SE)

(73) Assignee: Axis AB, Lund (SE)

( * ) Notice: Subject to any disclaimer, the term of this patent is extended or adjusted under 35 U.S.C. 154(b) by 206 days.

(21) Appl. No.: 18/503,586

(22) Filed: Nov. 7, 2023

(65) Prior Publication Data

US 2024/0163112 A1　　May 16, 2024

(30) Foreign Application Priority Data

Nov. 14, 2022　(EP) ..................................... 22207239

(51) Int. Cl.
　H04L 9/32　　　(2006.01)
　H04L 9/08　　　(2006.01)
　H04N 19/159　　(2014.01)
　H04N 19/177　　(2014.01)

(52) U.S. Cl.
　CPC .......... H04L 9/3247 (2013.01); H04L 9/0825 (2013.01); H04L 9/3236 (2013.01); H04N 19/159 (2014.11); H04N 19/177 (2014.11)

(58) Field of Classification Search
　CPC .... G06V 20/46; H04N 19/159; H04N 19/177; H04N 19/179; H04L 9/0825; H04L 9/3247; H04L 9/3236; H04L 9/3239; H04L 9/3242
　See application file for complete search history.

(56) References Cited

U.S. PATENT DOCUMENTS

| | | | |
|---|---|---|---|
| 5,907,619 | A | 5/1999 | Davis |
| 10,348,505 | B1 * | 7/2019 | Crawforth ........... G06F 21/1085 |
| 11,683,180 | B1 * | 6/2023 | Crawforth ............. H04L 9/0637 |
| | | | 713/164 |
| 2006/0136723 | A1 | 6/2006 | Taylor |
| 2011/0078459 | A1 | 3/2011 | Yoshioka et al. |
| 2014/0010366 | A1 * | 1/2014 | Quinn ................ H04N 21/8352 |
| | | | 380/200 |

(Continued)

FOREIGN PATENT DOCUMENTS

| | | |
|---|---|---|
| CN | 107040790 A | 8/2017 |
| CN | 115333742 A | 11/2022 |

(Continued)

*Primary Examiner* — Jeremy S Duffield
(74) *Attorney, Agent, or Firm* — Volpe Koenig

(57) ABSTRACT

A method of signing prediction-coded video data comprises: obtaining a coded video sequence comprising a set of frames including at least one intra frame having independently decodable image data, and at least one inter frame, containing image data decodable by reference to another frame; generating a group hash of the coded video sequence by hashing the image data of the coded video sequence; generating a plurality of individual hashes of frame subsets including at least one frame by hashing the image data derived from each of the frame subsets, reducing the length of each of the individual hashes to a length shorter than a total length of the group hash, generating a digital signature by encrypting at least the group hash and the individual hashes with reduced lengths; providing the group hash and the reduced length individual hashes together with the digital signature and the coded video sequence.

11 Claims, 4 Drawing Sheets

(56) References Cited

U.S. PATENT DOCUMENTS

| | | | | |
|---|---|---|---|---|
| 2014/0293978 A1* | 10/2014 | Yang | ........................ | H04L 67/51 |
| | | | | 370/338 |
| 2020/0162762 A1* | 5/2020 | Borsos | ................. | H04N 21/835 |
| 2021/0037270 A1* | 2/2021 | Taylor | ................... | H04L 9/3242 |
| 2021/0357364 A1* | 11/2021 | Saliba | .................... | G06F 21/565 |
| 2022/0058295 A1* | 2/2022 | Boehm | ................. | H04L 9/3242 |
| 2023/0141428 A1* | 5/2023 | Jacobson | ............. | H04L 9/3247 |
| | | | | 713/168 |
| 2023/0143574 A1* | 5/2023 | Hillman Beauchesne | .................. | |
| | | | | H04N 21/23418 |
| | | | | 382/103 |

FOREIGN PATENT DOCUMENTS

| | | | |
|---|---|---|---|
| EP | 4090015 A1 | 11/2022 | |
| JP | 2004-364263 A | 12/2004 | |
| WO | 2016/120619 A1 | 8/2016 | |

* cited by examiner

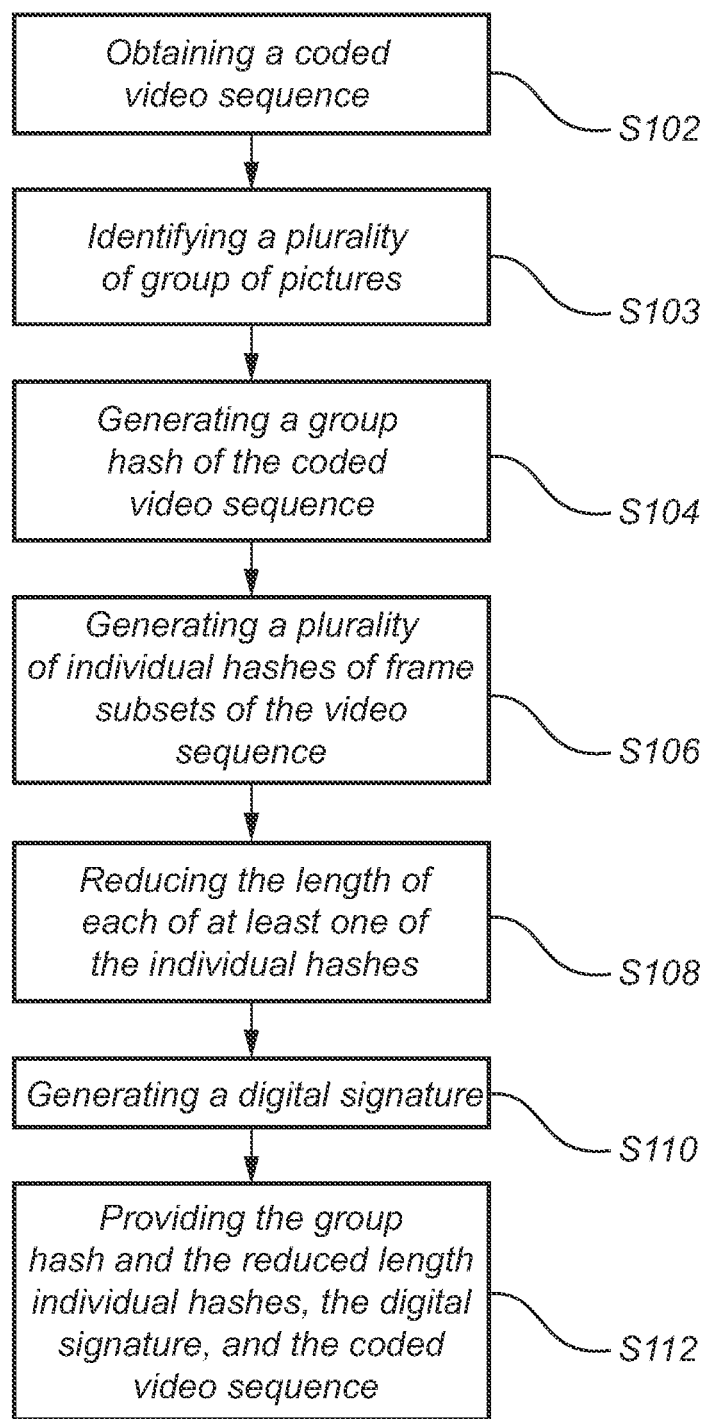

Obtaining a coded
video sequence — S102

Identifying a plurality
of group of pictures — S103

Generating a group
hash of the coded
video sequence — S104

Generating a plurality
of individual hashes of frame
subsets of the video
sequence — S106

Reducing the length of
each of at least one of
the individual hashes — S108

Generating a digital signature — S110

Providing the group
hash and the reduced length
individual hashes, the digital
signature, and the coded
video sequence — S112

*Fig. 3*

SIGNING VIDEO FOR REDUCED BIT RATE

FIELD OF INVENTION

The present disclosure generally relates to the field of validating the authenticity of video data. In particular, the present disclosure is related to methods and devices for signing of video data.

TECHNICAL BACKGROUND

A video sequence is an ordered sequence of video frames made up of pixels representing data acquired by an image sensor. If a real-world scene is being imaged by the image sensor, consecutive frames are strongly correlated, which is the underlying assumption in so called prediction coding. Coded video frames may be digitally signed before being transmitted from a camera, meaning that a digital signature is generated based on data of the coded video frames and sent together with the coded video frames to a receiver. The digital signature allows validation of the authenticity of the video frames themselves, and also that the video frames are captured by a specific camera.

Data transmitted with the digital signature can also include a list of hashes of the video frames in addition to the coded video frames. A hash is generated using a hash function to provide a compact representation, or mapping, of the original video frame that is difficult to reproduce from the hash. The list of hashes thus provides for hiding the original video frame and for reducing the amount of data to be transmitted in addition to the image frames. The list of hashes also provides a purpose of being able to verify individual video frames, i.e. determine if any video frame has been changed, and to identify if any video frames are missing and may have been dropped. A video frame can be dropped from a video stream for several reasons, for example due to buffer overfilling during transmission of the video through a video transmission system. In that case, the hash list can be used for determining that a video frame has been dropped and that the remaining video frames are authentic.

However, although the list of hashes provides for a promising approach for identifying dropped video frames and verifying individual video frames, and thus contributes to an increased level of secure video transmission, they contribute to an increased bit rate when transmitting the data. Hashes that are longer provide higher security, i.e. it is more difficult for an ill-tempered to tamper with video frames without affecting its corresponding hash, however they also add a higher amount of data. This shortcoming is addressed by the present disclosure as set out in more detail below.

SUMMARY

In view of above-mentioned and other drawbacks of the prior art, it is an object of the present disclosure to provide an improved method for signing of encoded video data that alleviates at least some of the drawbacks of prior art. More specifically, an object of the present disclosure is to provide a method of signing that can reduce the bit rate of the signed data when transmitted over a communication link.

According to a first aspect of the present disclosure, it is therefore provided a method of signing prediction-coded video data.

The method comprises obtaining a coded video sequence comprising a set of frames including at least one intra frame which contains independently decodable image data, and at least one inter frame, which contains image data decodable by reference to at least one other frame; generating a group hash of the coded video sequence by hashing the image data of the coded video sequence; generating a plurality of individual hashes of frame subsets including at least one frame by hashing the image data derived from each of the frame subsets, reducing the length of each of at least one of the individual hashes to a length shorter than a total length of the group hash, generating a digital signature by encrypting at least the group hash and the individual hashes with reduced lengths, and providing the group hash and the reduced length individual hashes together with the digital signature and the coded video sequence.

The present disclosure is based upon the realization that by reducing the length of each of the individual hashes, the amount of data that is transmitted is consequently reduced. The group hash provides for authentication of the frames of the coded video sequence as a group whereas the individual hashes provide for authentication of individual frames or frame subsets. Thus, the inventors realized that with the group hash the security level of video frame validation is not compromised despite the reduced length hashes.

Furthermore, instead of using a hashing scheme that produces shorter hashes, which thereby decrease the security level, a high security hashing scheme is used which produces relatively large number bytes of the individual hashes. This ensures a high security level for a digital signature that is generated based on the hashes, since larger bytes of the hash, i.e., longer hashes, are more difficult to reproduce than smaller byte hashes, or equally shorter hashes. If the hash is harder to reproduce, tampering of the video frames undetected is more difficult.

By the provision of embodiments herein, signing of prediction-coded video data can be performed in such a way that the bitrate is reduced without compromising the security for validating the authenticity of the video data.

Reducing a length of a hash is herein understood as a truncation of the hash or a masking of individual characters or digits or bytes of the hash to in this way reduce the length of the hash to be transmitted. Thus, the hashes are initially produced with a first length or size, and after a length or size reduction, each have a length shorter than the first length, or equally understood as a size smaller than the first size. The reduced length individual hashes may or may not be of the same lengths. However, some, e.g., a subset of the reduced length individual hashes may have equal length.

The length of a hash herein refers to the number of characters or digits, or number of bytes that the hash takes up.

In the present disclosure, "a hash" of a data item $B_1$ includes both a first-order hash $h(B_1)$ and higher-order hashes obtained by recursive hashing. The term covers at least the following examples:

$$h(h(B_1))=(h \circ h)(B_1),$$

$$(h \circ \ldots \circ h)(B_1),$$

$$h(\{h(B_1), h(B_2)\}),$$

where $B_2$ is a further data item and $\{\bullet\}$ denotes a data combining operation, such as concatenation. As such, "a hash of a first portion of the video data" includes a first-order hash of said portion as well as a hash of the hash or a hash of a combination of hashes.

A coded video frame may be described as one or several NAL units (network abstraction layer, H26x), or open bit-stream units (OBUs, codec AV1) where each NAL/OBU unit comprises compressed image data and metadata such as a header, decoding information, etc. It is understood that the hashes described herein may be hashes of the entire NAL or OBU units or of the image data alone. In other words, it is envisaged that a group hash of the coded video sequence is generated by hashing the NAL units, or OBU units of the coded video sequence. In addition, it is envisaged that the plurality of individual hashes of frame subsets including at least one frame is generated by hashing the NAL units, or OBU units, derived from each of the frame subsets.

In one embodiment, the lengths of the plurality of individual hashes may be reduced to a set of lengths different from each other. In other words, the length of at least one reduced length individual hashes may be different, i.e., longer or shorter, from the length of at least one other reduced length individual hashes. This is further understood as that a first subset of individual hashes may each be reduced to a first length and a second subset of individual hashes may each be reduced to a second length, and so on. In this way, the individual hashes of more important frames can be allowed to be longer than the individual hashes of less important frames, potentially reducing the bitrate further. In one possible implementation a mapping function may be employed to map a hash to a hash of reduced length.

In one embodiment, lengths of the set of lengths may depend on the position of the respective frame subset in a group of pictures (GOP) of the coded video sequence. A group of pictures includes an initial intra frame, a set of intermediate inter frames that are decodable by reference to at least one other frame. An intra frame, or I-frame, is a data structure with independently decodable image data, which can be decoded into a plaintext video frame (or a block of a video frame) by means of a predefined associated decoding operation.

An inter frame may be a P-frame is a data structure whose associated decoding operation refers not only to the image data of the P-frame itself but also to at least one other I- or P-frame. Conceptually, and somewhat simplified, the image data in a P-frame expresses the change or movement relative to the video frame that its preceding I- or P-frame encodes.

A further type of inter frame is the bidirectionally predicted B-frame. The underlying bidirectional prediction operation may include interpolation between the referenced frames, such as smoothing. A B-frame can refer to a I-, P- or B-frame that need not be immediately preceding or immediately following but can be two or more steps away in both directions, i.e., forward and backward in time. In a similar way, a P-frame can refer to a I-, P- or B-frame that need not be immediately preceding but can be two or more steps away.

The position of a frame within a GOP relative other frames determines the importance of that frame and thereby also the length of the reduced length hash of that specific frame or subset of frames.

In one embodiment, the lengths of the plurality of individual hashes may decrease for frame subsets in positions further from an initial intra frame in a group of pictures of the coded video sequence. Accordingly, the closer to the initial intra frame of the given group of pictures, or independently decodable I-frame, the longer the hash.

In one embodiment, the reduction of lengths of the each of the individual hashes may depend on the byte size of the respective frame subset. Accordingly, a larger byte size of the frame or subset of frames, the longer the respective hash.

The length of the reduced length hashes may be determined from a mapping function or look-up table that associates hash length with byte size.

In one embodiment, a single hash may be generated for each intra frame. The I-frame is the most important frame since it is independently decodable and provides a reference for all consecutive interframes of the GOP. Therefore, it is desirable that one hash is produced for each intra frame.

In one embodiment, the hash of each intra frame may be maintained at their full hash length, wherein the individual hash of each intra frame is included in the encryption for generating the digital signature, and the step of providing includes to provide also the individual hash of each intra frame. This means that the hash of an intra frame, being the most important frame, is not reduced or shortened. Thus, the original length of the initially produced hash of an intra-frame is maintained, whereas each hash of the subset of inter-frames is reduced.

In one embodiment, the method may comprise: identifying a plurality of group of pictures, each group of pictures being independently decodable; generating a group hash for each group of pictures and a plurality of individual hashes for respective frame subsets of the group of pictures; and providing the group hash and the individual hashes for each identified group of pictures. This is to say, the group hash and the individual hashes are produced on basis of identified groups of pictures.

In one embodiment, the group hash may be generated for frames including intra frames for at least two consecutive group of pictures. By including the intra frame of a consecutive GOP in the signature of the earlier GOP allows for including GOPs sequencing information in the signature.

In one embodiment, the group hash may be generated by hashing a list of the respective plurality of individual hashes. Thus, it is envisaged that the group hash is a hash of a hash.

In one embodiment, the group hash and the individual hashes may be generated using the same hash function.

In one embodiment, each subset of frames may contain a single frame. That is to say, an individual hash is the hash of only a single frame.

According to a second aspect of the present disclosure, there is provided a method of validating a prediction-coded video data, the method comprising: obtaining a coded video sequence comprising a set of frames including at least one intra frame which contains independently decodable image data, and at least one inter frame, which contains image data decodable by reference to at least one other frame; obtaining a group hash associated with the frames of the coded video sequence, reduced length individual hashes associated with frame subsets of the coded video sequence, and a digital signature encrypting the group hash and the reduced length individual hashes, verifying the digital signature by decrypting the digital signature using a public key, generating a group hash of the coded video sequence by hashing data derived from the coded video sequence; generating a plurality of individual hashes of frame subsets including at least one frame by hashing data derived from the frame subsets, comparing the generated group hash with the obtained group hash, and, if a deviation is found: comparing the generated plurality of individual hashes with the obtained reduced length individual hashes, and generating a signal indicating the outcome of the comparison.

The hash function used at the validation end to generate the group hash and the individual hashes of the obtaining coded video sequence is the same as the hash function used for hashing the coded video sequence at the signing end, at the sender side, where the obtained group hash and reduced length individual hashes are generated.

In one embodiment, the reduction in lengths of each of the obtained individual hashes may depend on the byte size of the respective frame subset, the method may further comprise determining expected lengths of each of the obtained reduced length individual hashes from a predetermined relationship between byte size and hash length, comparing the lengths of each of the obtained individual hashes with the respective expected lengths, and including the outcome of the comparison in the signal. This adds a further level of security since it can be anticipated, form the byte size of the subsets of frames, what size or length the respective hashes should have. The predetermined relationship may for example be a mapping function or a look-up table.

The generated group hash is used for validating video sequence, or more specifically individual GOPs. If the generated group hash and the obtained group hash do not match, embodiments of the present disclosure provide for analyzing why it failed, for example if the failure is due to a lost or changed frame.

Accordingly, in one embodiment, the generated signal may indicate one or more frames that are missing in the obtained coded video sequence. By comparing a list of generated individual hashes with the obtained reduced length individual hashes, it can be concluded which of the generated individual hashes is missing which thereby corresponds to a respective subset of frames.

In one embodiment, the generated signal may indicate one or more frames that have been tampered with in the obtained coded video sequence. By comparing the obtained reduced length individual hashes with corresponding individual hashes, one by one, it is envisaged that hashes that are not equal over the reduced length can be concluded to indicate that a frame of the respective subset has been altered or tampered with.

Further embodiments of, and effects obtained through this second aspect of the present disclosure are largely analogous to those described above for the first aspect and the second aspect of the disclosure.

According to a third aspect of the present disclosure, there is provided a device comprising processing circuitry arranged to perform the method of any of the herein disclosed embodiments of the first and the second aspect.

Further embodiments of, and effects obtained through this third aspect of the present disclosure are largely analogous to those described above for the first aspect and the second aspect of the disclosure.

According to a fourth aspect of the present disclosure, there is provided a computer program comprising instructions which, when the program is executed by a computer, cause the computer to carry out the method of any of the herein disclosed embodiments of the first and the second aspect.

Further embodiments of, and effects obtained through this fourth aspect of the present disclosure are largely analogous to those described above for the other aspects of the disclosure.

A computer program product is further provided including a computer readable storage medium storing the computer program. The computer readable storage medium may for example be non-transitory, and be provided as e.g. a hard disk drive (HDD), solid state drive (SDD), USB flash drive, SD card, CD/DVD, and/or as any other storage medium capable of non-transitory storage of data.

Further features of, and advantages with, the present disclosure will become apparent when studying the appended claims and the following description. The skilled addressee realizes that different features of the present disclosure may be combined to create embodiments other than those described in the following, without departing from the scope of the present disclosure.

BRIEF DESCRIPTION OF THE DRAWINGS

The various aspects of the disclosure, including its particular features and advantages, will be readily understood from the following detailed description and the accompanying drawings, in which:

FIG. 3 is a flow-chart of method steps according to embodiments of the disclosure;

DETAILED DESCRIPTION

Figures 1, 2:
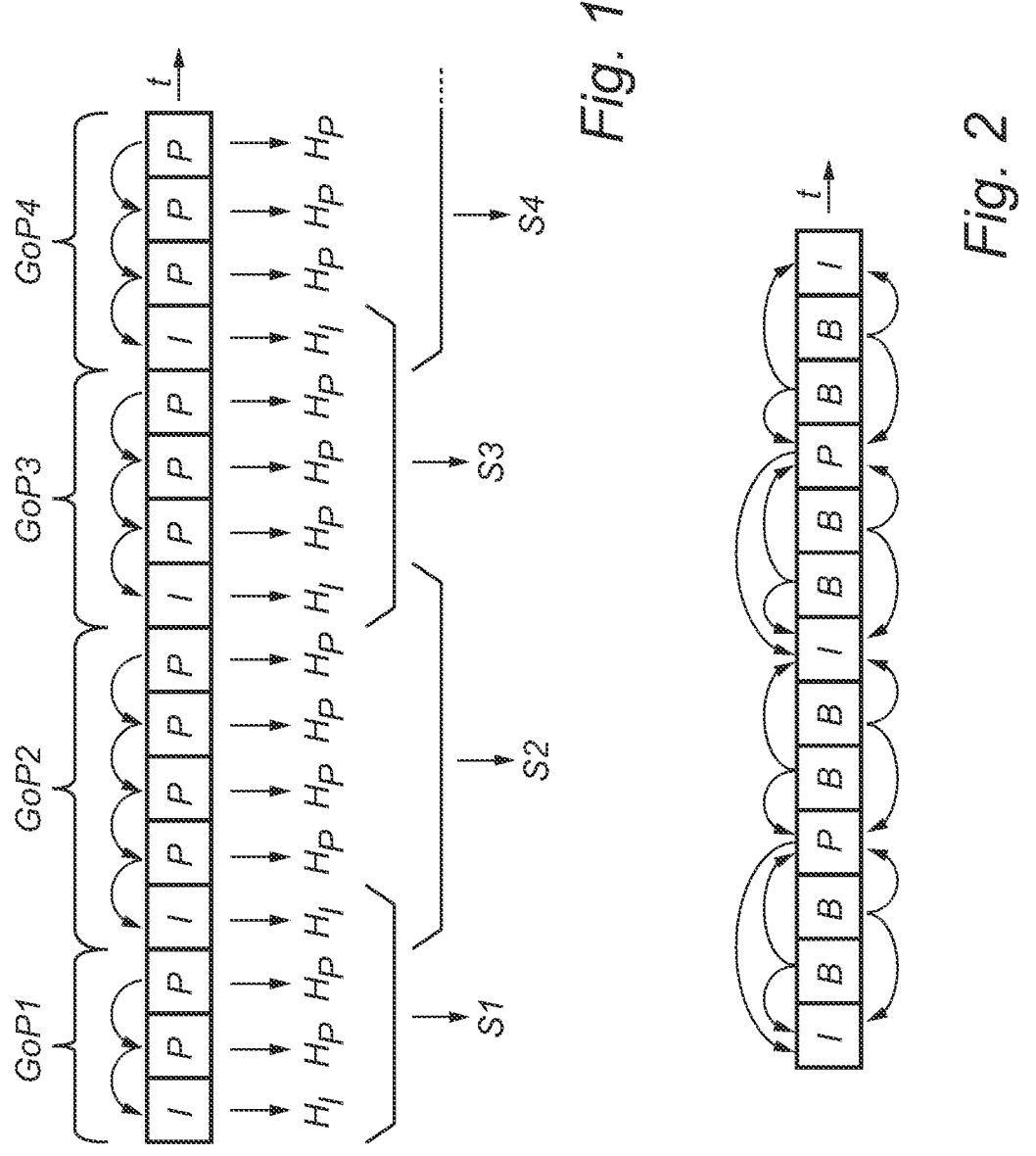
FIG. 1 conceptually illustrates a coded video sequence.
FIG. 2 conceptually illustrates a coded video sequence.

The present disclosure will now be described more fully hereinafter with reference to the accompanying drawings, in which currently preferred embodiments of the disclosure are shown. This disclosure may, however, be embodied in many different forms and should not be construed as limited to the embodiments set forth herein; rather, these embodiments are provided for thoroughness and completeness, and fully convey the scope of the disclosure to the skilled person. Like reference characters refer to like elements throughout.

FIG. 1 illustrates a segment of a prediction-coded video sequence composed of intra-frames, I-frames, and inter frames, P-frames. An I-frame is a data structure which contains independently decodable image data, and an inter frame contains image data decodable by reference to at least one other frame. The decoding is performed into a plaintext video frame (or a block of a video frame) by means of a predefined associated decoding operation.

A P-frame is a data structure whose associated decoding operation refers not only to the image data of the P-frame itself but also to at least one other I- or P-frame. Generally, the image data in a P-frame expresses the change or movement relative to the video frame that its preceding I- or P-frame encodes. If the decoding operations are successful, video frames decoded from P-frames and I-frames are in general indistinguishable.

The inter-frame dependencies are indicated in FIG. 1 as arc-shaped arrows oriented in the negative time direction, t. In the depicted simple example, each P-frame refers to the immediately preceding I- or P-frame. If the first P-frame refers to a second P-frame, the second P-frame necessarily refers to at least one further I- or P-frame. In the present disclosure, the first P-frame will be said to refer directly to the second P-frame and to refer indirectly to the at least one further I- or P-frame. Because the image data in an I-frame is independently decodable, the chain of references (arc-shaped arrows) does not continue past an I-frame. The combination of an I-frame and the subsequent P-frames which refer to the I-frame directly or indirectly can be referred to as a group of pictures (GOP). Four GOPs are indicated in FIG. 1: IPP, IPPPP, IPPP, IPPP.

FIG. 2 illustrates a further example of inter-frame prediction where inter-frame dependencies are again indicated by arc-shaped arrows. In addition to the forward-predicted P-frame structure, a bidirectionally predicted B-frame is used. The underlying bidirectional prediction operation may include interpolation between the referenced frames, such as smoothing. It is furthermore seen in FIG. 2 that a B-frame can refer to a I-, P- or B-frame that need not be immediately preceding or immediately following but can be two or more steps away. In a similar fashion, a P-frame can refer to a I-, P- or B-frame that need not be immediately preceding but can be two or more steps away. The video sequence IBBPB-BIBBPBBI shown in FIG. 2 may be characterized as a GOP since it can be decoded without reference to any other I-, P- or B-frames. Recommendation ITU-T H.264 (06/2019) "Advanced video coding for generic audiovisual services", International Telecommunication Union, specifies a video coding standard in which both forward-predicted and bidi-rectionally predicted frames are used.

With regards to embodiments of the present disclosure, a group hash is the hash of a coded video sequence including a set of frames including at least one I-frame. In FIG. 1, the group hashes are conceptually depicted as S1, S2, S3, and S4. One group hash may be generated for each group of pictures (GoP) by hashing the frames of the respective GoP, preferably also including intra frames for at least two consecutive group of pictures. That is, the group hash S1 is in this example the hash of GoP1 and the !-frame of the next consecutive group of pictures GoP2, the group hash S2 is the hash of the frames of GoP2 and the I-frame of the next consecutive group of pictures GoP3, and so on. A group hash may equally well be constructed in other ways, such as using the last or an arbitrary number of P-frames from a preceding GoP in the hash for a present GoP. That is, overlapping frames between consecutive GoPs may be realized in different ways to ensure the correct order of the GoPs and their group hashes.

The respective individual hashes, $H_I$, $H_P$ of the intra frame, I-frame, and the inter frame, P-frame or B-frame, are generated using hash functions, preferably the same hash function. Further, the group hash and the individual hashes are preferably generated using the same hash function. The hash functions may for example 1024 bits or a simpler function such as 256 bits which has a lower computational cost. Three examples of hash functions are SHA-256, SHA3-512 and RSA-1024.

Figure 4:
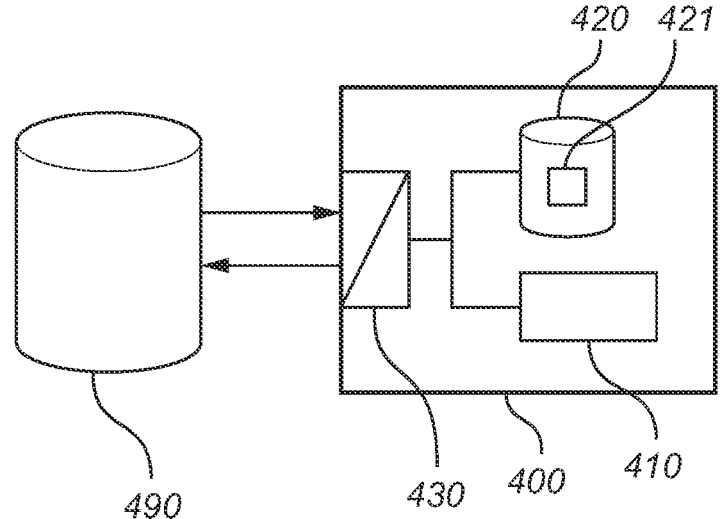
FIG. 4 is a block diagram of a device according to embodiments of the disclosure.

With reference to FIGS. 3 and 4, a method of signing prediction-coded video data will be described. The method, which provides a signature on the basis of a coded video sequence and a set of hashes for video sequence validation, may be carried out by a suitably arranged generic programmable computer (e.g., with the relevant input and output interfaces) and, in particular, by means of the device 400 depicted in block-diagram form in FIG. 4. The device 400 comprises processing circuitry 410, a memory 420, and an input-output interface 430 which is adapted for bidirectional communication with an external memory 490 which stores, during some operational phases, the coded video sequences to be signed. The device 400 and the external memory 490 may be owned and operated by different entities, as is the case when the signing is provided as an external service, or by a common entity. The (internal) memory 420 of the device 400 may be suitable for storage of a program 421 with software instructions for carrying out the method, cryptographic information (e.g., private keys) for generating signatures, as well as logs, configuration files and data supporting various internal housekeeping procedures. The device 400 may be provided as a local computer or server, or it may be implemented in a distributed fashion on the basis of networked (cloud) processing resources. In particular, the device 500 may be integrated in a digital video camera, such as a video camera adapted for a monitoring application.

In a first step S102 of the method, a coded video sequence is obtained. The coded video sequence comprises a set of frames including at least one intra frame (e.g., I-frame) which contains independently decodable image data, and at least one inter frame (P- and/or B-frames), which contains image data decodable by reference to at least one other frame. It is understood that the inter frames may include unidirectionally predicted frames (P-frames), bidirectionally predicted frames (B-frames), or a mixture of both types. Obtaining the coded video sequence may include gaining access to a memory where the video data is stored (e.g., the external memory 490 in FIG. 4), downloading the video data, receiving a transmission, and/or through device internal communication or on-chip communication within the device 400, with the video data. The video sequence may be coded in any suitable format, such as ITU-T H.265, AV1 and the already mentioned ITU-T H.264.

In a second step S104, a group hash (S1-S4) of the coded video sequence is generated by hashing the image data of the coded video sequence. The group hash may be temporality stored in anticipation of subsequent steps.

In step S106, a plurality of individual hashes of frame subsets including at least one frame is generated by hashing the image data derived from each of the frame subsets.

As a preceding step to step S104, an optional step S103 may be included and comprises identifying a plurality of groups of pictures, each group of pictures being independently decodable. In such case, a group hash is generated for each group of pictures in step S104 and individual hashes for respective frame subsets of the group of pictures in step S106. The group hash is generated on frames including intra frames for at least two consecutive group of pictures.

The group hashes S1-S4 may be generated by directly hashing the image data of the video sequence, or a group of pictures, or by hashing a list of the respective plurality of individual hashes of the video sequence, or a group of pictures. In other words, as one example, the hash function is applied to the image data, or the hash function is applied to the list of individual hashes, i.e., in a hash of a hash function.

A subset of frames, from which the individual hashes, $H_I$, $H_P$ are generated may include one or more inter frames, or a single frame, as conceptually illustrated in FIG. 1.

In a subsequent step, S108, the length of each of at least one of the individual hashes are reduced to a length shorter than a total length of the group hash. However, the individual hash of the I-frame is preferably not reduced and is thus maintained at its full length. Preferably, it is the individual hashes of frames or subsets of frames including inter-frames that are reduced in length. A single hash is generated for each intra frame, I-frame.

As an example, GoP2 in FIG. 1 will be considered. GoP2 includes the frames IPPPP. The group hash S2 is the hash of the frame sequence IPPPPI where the next GoPs I-frame is included. The group hash and the individual hashes are represented as, where h is the hash function:

$S2=h(IPPPPI)$ $H_I=h(I)$ $H_P=h(P)$ $H_P=h(P)$ $H_P=h(P)$ $H_P=h(P)$ $H_I=h(I)$

Equally, the group hash S2 could be represented as the hash of the list of individual hashes:

$$S1=h([H_I\, H_P\, H_P\, H_P\, H_P\, H_I])$$

It is understood that the individual hashes are generated with a first, original, length, as given by the hash function used for generating the group hash and the individual hashes. Next, the individual hashes are shortened, or truncated, by masking out bytes of the hash string. For example, using a relatively simple 32-byte hash function, the generated individual hashes may be:

$H_I$=fbfa7c51f94fc2313ffebb2f5ecd5272
$H_P$=dd01c9f30c65e00fa998ee3f6e522d1f
$H_P$=c3e42c72a45685114b83ad74da1f5c15
$H_P$=6d1926fdc7f4bd91b0e80e1154f40276
$H_P$=1e4017ab091dfc7fedef7ea1b5eeeb95
$H_I$=fbea8e40a2e11033ce111b2c575401d2

Reducing the length of the hashes now produces, for a constant length truncation which generates equal length hashes, here exemplified as keeping the 7 first bytes:

$H_I$=fbfa7c51f94fc2313ffebb2f5ecd5272
$H_P$=dd01c9f30c65e00fa998ee3f6e522d1f
$H_P$=c3e42c72a45685114b83ad74da1f5c15
$H_P$=6d1926fdc7f4bd91b0e80e1154f40276
$H_P$=1e4017ab091dfc7fedef7ea1b5eeeb95
$H_I$=fbea8e40a2e11033ce111b2c575401d2

It is understood that keeping the 7 first bytes only serve as a conceptual example and the number of bytes of the reduced length hashes depends on the implementation at hand.

As further development, the lengths of the plurality of individual hashes may be reduced to a set of lengths different from each other. This should be interpreted as that not all of the individual hashes must have unique lengths, although this is of course envisaged as one possibility. However, it should be understood that a multiple of unique lengths among the set of all reduced lengths are included. Turning again to the above example, truncation to a set of lengths may generate a set of individual hashes:

$H_I$=fbfa7c51f94fc2313ffebb2f5ecd5272
$H_P$=dd01c9f30c65e00fa998ee3f6e522d1f
$H_P$=c3e42c72a45685114b83ad74da1f5c15
$H_P$=6d1926fdc7f4bd91b0e80e1154f40276
$H_P$=1e4017ab091dfc7fedef7ea1b5eeeb95
$H_I$=fbea8e40a2e11033ce111b2c575401d2

The length of the first two hashes of the P-frames is of equal length, i.e., of one of the lengths of the set of lengths. The remaining individual hashes all have unique lengths. The length of the group of pictures initial I-frame is not reduced in this example. The initial I-frame, which is the first frame of the GOP frame sequence, is the most important frame of a GOP, since it is independently decodable and the inter frames, P/B-frames, depend on the initial I-frame. It is preferred to maintain the full length of the hash of the initial I-frames.

Furthermore, as is also conceptualized in the above example, lengths of the set of lengths depend on the position of the respective frame subset in a group of pictures of the coded video sequence. Thus, the individual hash of the P-frame directly subsequent to the I-frame is maintained longer than the individual hashes of consecutive P-frames. As above, earlier inter frames are considered more important since they affect more consecutive inter frames than later frames.

As a further development, the reduction of lengths of the individual hashes depends on the byte size of the corresponding frame subset. In other words, the length of an individual hash of a relatively larger byte size frame will be reduced less than the length of an individual hash of a relatively smaller byte size frame. The reduced lengths may be determined from a mapping function with relationships between number of bytes and hash lengths.

Returning to the flow-chart in FIG. 3, in step S110, a digital signature is generated by encrypting at least the group hash and the individual hashes with reduced lengths. The signature may be formed by collecting the generated hashes in a so-called document (a text file or another data structure) and digitally signing the document. The document signature may for example be generated by asymmetric cryptography, i.e., using a private key from a key pair in which the public key is shared with the recipient such that the recipient is able to verify the signature. The public key may be shared with the recipient at the time of validation, or at any other time prior to validation. Thus, it is not required that the public key is shared with the recipient at the time when the digital signature is generated.

In step S112, the group hash and the reduced length individual hashes are provided together with the digital signature and the coded video sequence. Providing may include transmitting to a recipient, a server, or storing in a memory 490. The document and signature may be transmitted in a so called supplemental enhancement information (SEI) frame.

The embodiments of the present disclosure aim to reduce the bitrate of the data transmitted with the signature via the interface 430. The above-described reduction of lengths of the individual hashes provides for less data to be transmitted compared to keeping the full lengths individual hashes, especially in cases where the reduction is larger than the size of the group hash. Moreover, despite reducing the bitrate, the security of the validation can be maintained at a high level as will be discussed next.

Figure 5:
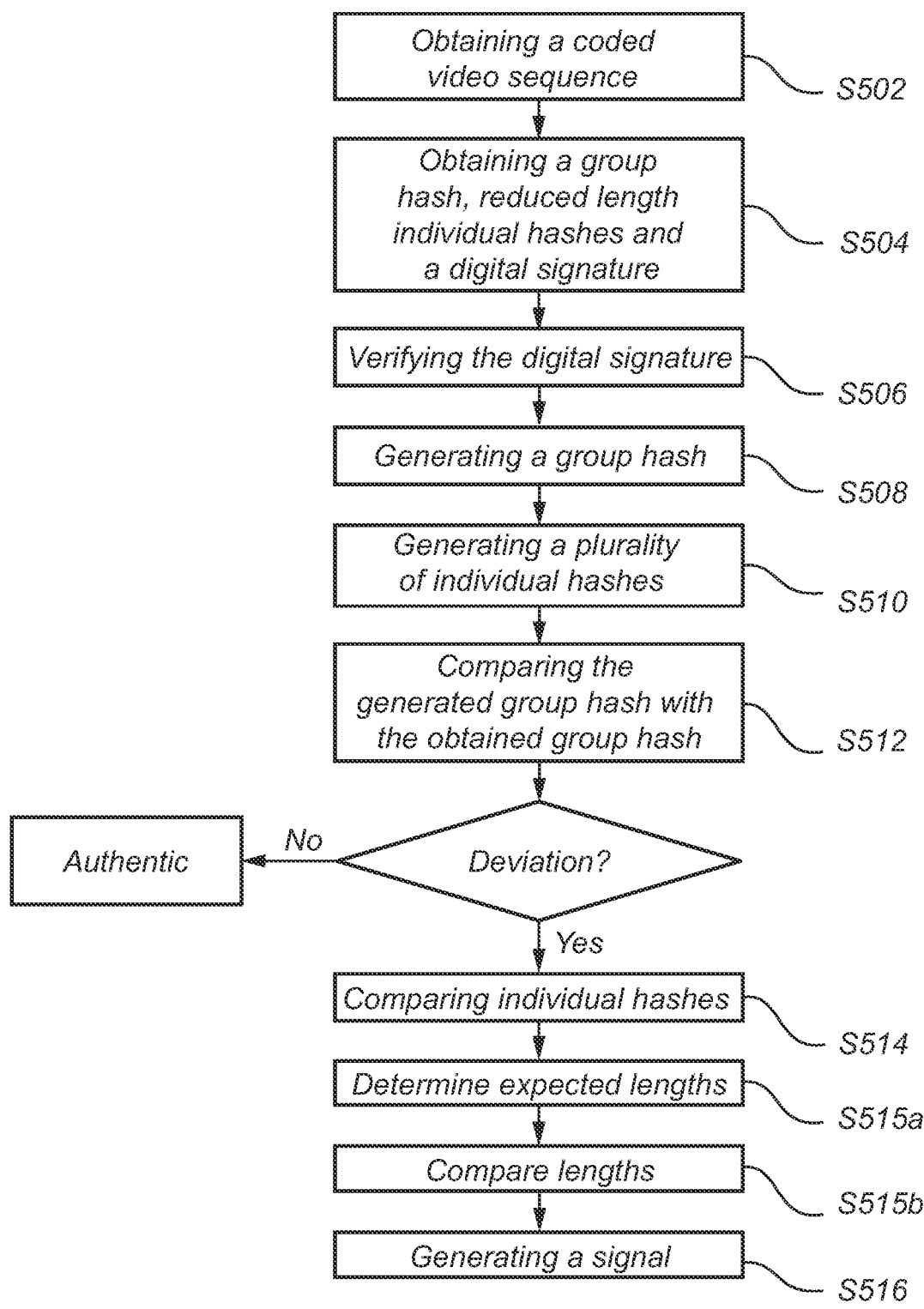
FIG. 5 is a flow-chart of method steps according to embodiments of the disclosure.

On the receiver end, the prediction-coded video data is validated as will be now described in more detail with respect to the flow-chart in FIG. 5.

In step S502, a coded video sequence is obtained comprising a set of frames including at least one intra frame which contains independently decodable image data, and at least one inter frame, which contains image data decodable by reference to at least one other frame. This obtained coded video sequence may be obtained from the memory 490, or via server or the like by a receiver of the video sequence.

Further, in step S504 a group hash associated with the frames of the coded video sequence, reduced length individual hashes associated with frame subsets of the coded video sequence, and a digital signature encrypting the group hash and the reduced length individual hashes is obtained. The obtained hashes are generated as described with reference to the flow-chart of FIG. 3.

In step S506, the digital signature is verified using the public key.

In step S508 a group hash of the coded video sequence is generated by hashing data derived from the coded video sequence.

In step S510, a plurality of individual hashes of frame subsets including at least one frame are generated by hashing data derived from the frame subsets. The hash function or algorithm used for generating the hashes on the validation side is the same as the hash function or algorithm used for generating the obtained hashes.

In subsequent steps, the obtained group hash is attempted to be verified by comparing, in step S512, the generated group hash with the obtained group hash.

If the verification is successful, it can be concluded that the video data is authentic. This may be included in a validation signal generated by a control unit on the receiver side.

However, if a deviation is found between the group hashes in step S512 it can be conclude that one of two things have occurred: a frame is missing, or one or more frames have been altered, replaced, or added.

In case of unsuccessful verification of the obtained group hash, the generated plurality of individual hashes is compared with the obtained reduced length individual hashes in step S514.

In step S516, a signal is generated that indicates the outcome of the comparison.

One example of outcome is that one or more frames that are missing in the obtained coded video sequence. Using the above example, the obtained reduced length individual hashes may be:

$H_I$=fbfa7c51f94fc2313ffebb2f5ecd5272

$H_P$=dd01c9f30c65e00fa998ee3f6e522d1f $H_P$=c3e42c72a45685114b83ad74da1f5c15

$H_P$=6d1926fdc7f4bd91b0e80e1154f40276

$H_P$=1e4017ab091dfc7fedef7ea1b5eeeb95

$H_I$=fbea8e40a2e11033ce111b2c575401d2

Where the crossed-out digits are not included in the document provided on the signing side and thus not retrievable from the memory 490, or server or likewise. The generated individual hashes on the validation side, in case of a missing frame, may be:

$H'_I$=fbfa7c51f94fc2313ffebb2f5ecd5272

$H'_P$=dd01c9f30c65e00fa998ee3f6e522d1f $H'_P$=c3e42c72a45685114b83ad74da1f5c15

$H'_P$=6d1926fdc7f4bd91b0e80e1154f40276

$H'_P$=$H'_I$=fbea8e40a2e11033ce111b2c575401d2

In other words, one of the individual hashes is blank or null. Comparing the individual hashes $H_I$, $H_P$ with the individual hashes $H'_I$, $H'_P$ thus enables identifying the missing frame. The other individual hashes match, whereby their respective frames can be concluded with a sufficiently high probability to be authentic.

One other example of outcome is that one or more frames that have been tampered with in the obtained coded video sequence. Using the above example again, the obtained reduced length individual hashes may be:

$H_I$=fbfa7c51f94fc2313ffebb2f5ecd5272

$H_P$=dd01c9f30c65e00fa998ee3f6e522d1f $H_P$=c3e42c72a45685114b83ad74da1f5c15

$H_P$=6d1926fdc7f4bd91b0e80e1154f40276

$H_P$=1e4017ab091dfc7fedef7ea1b5eeeb95

$H_I$=fbea8e40a2e11033ce111b2c575401d2

The generated individual hashes on the validation side, in case of a tampered or altered frame, may be:

$H'_I$=fbfa7c51f94fc2313ffebb2f5ecd5272

$H'_P$=f15c9y70dgu35omp7bcd1234efgh5678

$H'_P$=c3e42c72a45685114b83ad74da1f5c15

$H'_P$=6d1926fdc7f4bd91b0e80e1154f40276

$H'_P$=1e4017ab091dfc7fedef7ea1b5eeeb95

$H'_I$=fbea8e40a2e11033ce111b2c575401d2

Here, the digits in the generated individual hash that are different from the corresponding digits in the obtained individual reduced length hash are indicated in bold in the second generated individual hash. Accordingly, it can be identified also in this case, which frame has been altered and that thus cannot be trusted as being authentic.

In a further development, that provides an additional layer of security, the reduction in lengths of each of the obtained individual hashes depends on the byte size of the respective frame subset. In such implementation, an optional step S515a is added that includes determining expected lengths of each of the obtained reduced length individual hashes from a predetermined relationship between byte size and hash length. The predetermined relationship such as a mapping function of look-up table may be transmitted alongside the signature or may be stored in a memory accessible to both the signature side and the validation side. An example table may be:

| Frame size | Length of truncated hash |
| --- | --- |
| 0-100 bytes | 1 byte |
| 101-200 bytes | 3 bytes |
| 201-400 bytes | 5 bytes |
| 401-1000 bytes | 7 bytes |
| 1000-3000 bytes | 10 bytes |
| 3001-10000 bytes | 14 bytes |
| More than 10000 bytes | 20 bytes |

Thus, using a look-up table or another mapping function the expected lengths of the obtained individual hashes can be determined from the byte size of the frames of the obtained coded video sequence.

In this development, in step S515b the lengths of each of the obtained individual hashes are compared with the respective expected lengths. In the unlikely event that frames are tampered with in such a way that the obtained hash and the generated group hash matches, this development provides for detecting this by comparing the lengths of each of the obtained individual hashes with the respective expected lengths. Thus, a second layer of security is provided.

However, in some implementations, optional step S515a is performed only if a deviation is found when comparing the generated group hash with the obtained group hash in step S512.

The outcome of this comparison is included in the signal in step S516. If any one of the lengths of the obtained individual hashes does not match the length of the respective generated individual hash, the validation fails, and the authenticity of the current group of pictures, or coded video sequence cannot be trusted.

The control unit includes a microprocessor, microcontroller unit, programmable digital signal processor, or another programmable device. The control unit may also, or instead, include an application specific integrated circuit, a programmable gate array or programmable array logic, a programmable logic device, or a digital signal processor. Where the control unit includes a programmable device such as the microprocessor, microcontroller unit, or programmable digital signal processor mentioned above, the processor may further include computer executable code that controls operation of the programmable device.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a sequence the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the disclosure has been described with reference to specific exemplifying embodiments thereof, many different alterations, modifications and the like will become apparent for those skilled in the art.

In addition, variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method of signing prediction-coded video data, comprising:
   a) obtaining a coded video sequence comprising a set of frames including:
      at least one intra frame that contains independently decodable image data, and
      at least one inter frame that contains image data decodable by reference to at least one other frame of the set of frames;
   b) generating a group hash of the coded video sequence by hashing the independently decodable image data and the image data;
   c) generating a plurality of individual hashes of frame subsets including at least one frame by hashing the independently decodable image data and the image data derived from the frame subsets;
   d) reducing a length of each of the plurality of individual hashes to a length shorter than a total length of the group hash to provide reduced lengths;
   e) generating a digital signature by encrypting at least the group hash and the plurality of individual hashes with the reduced lengths; and
   f) providing the group hash and the plurality of individual hashes with the reduced lengths together with the digital signature and the coded video sequence,
   wherein the reduced lengths comprise a set of lengths different from each other, and wherein lengths of the set of lengths depend on a position of the respective frame subset in a group of pictures of the coded video sequence.

2. The method according to claim 1, wherein the reduced lengths of the plurality of individual hashes decrease for the frame subsets in positions further from an initial intra frame in the group of pictures of the coded video sequence.

3. A method of signing prediction-coded video data, comprising:
   a) obtaining a coded video sequence comprising a set of frames including:
      at least one intra frame that contains independently decodable image data, and
      at least one inter frame that contains image data decodable by reference to at least one other frame of the set of frames;
   b) generating a group hash of the coded video sequence by hashing the independently decodable image data and the image data;
   c) generating a plurality of individual hashes of frame subsets including at least one frame by hashing the independently decodable image data and the image data derived from the frame subsets;
   d) reducing a length of each of the plurality of individual hashes to a length shorter than a total length of the group hash to provide reduced lengths;
   e) generating a digital signature by encrypting at least the group hash and the plurality of individual hashes with the reduced lengths; and
   f) providing the group hash and the plurality of individual hashes with the reduced lengths together with the digital signature and the coded video sequence,
   wherein the reduced lengths comprise a set of lengths different from each other, and
   wherein reducing the lengths of the each of the plurality of individual hashes depends on a byte size of the respective frame subset.

4. The method according to claim 1, wherein a single hash is generated for each intra frame.

5. The method according to claim 4, wherein the respective single hash of each intra frame is maintained at its full hash length,
   wherein the individual hash of each intra frame is included in the encryption for generating the digital signature, and the step of providing includes to provide also the individual hash of each intra frame.

6. The method according to claim 1, comprising:
   identifying a plurality of groups of pictures, each group of pictures being independently decodable;
   generating a respective additional group hash for each group of pictures and the plurality of individual hashes for respective frame subsets of the group of pictures; and
   providing the respective additional group hash and the individual hashes for each identified group of pictures.

7. The method according to claim 6, wherein the respective additional group hash is generated for frames including intra frames for at least two consecutive group of pictures.

8. A method of validating a prediction-coded video data, the method comprising:
   a) obtaining a coded video sequence comprising a set of frames including:
      at least one intra frame that contains independently decodable image data, and
      at least one inter frame that contains image data decodable by reference to at least one other frame;

b) obtaining a first group hash associated with the set of frames of the coded video sequence, reduced length individual hashes associated with frame subsets of the coded video sequence, and a digital signature encrypting the first group hash and the reduced length individual hashes;

c) verifying the digital signature by decrypting the digital signature using a public key;

d) generating a second group hash of the coded video sequence by hashing data derived from the coded video sequence;

e) generating a plurality of individual hashes of the frame subsets including at least one frame by hashing data derived from the frame subsets; and f) comparing the first group hash with the second group hash, and, if a deviation is found:

g) comparing the plurality of individual hashes with the reduced length individual hashes, and h) generating a signal indicating an outcome of the comparing of the plurality of individual hashes with the reduced length individual hashes, wherein reductions in lengths of each of the reduced length individual hashes depends on a byte size of the respective frame subset, wherein the method further comprises:

determining expected lengths of each of the reduced length individual hashes from a predetermined relationship between the byte size and the hash length, comparing the lengths of each of the plurality of individual hashes with the respective expected lengths, and including a result of the comparing of the plurality of individual hashes with the reduced length individual hashes in the outcome.

9. The method according to claim 8, wherein the signal indicates one or more frames that are missing in the coded video sequence.

10. The method according to claim 8, wherein the signal indicates one or more frames that have been tampered with in the coded video sequence.

11. A non-transitory computer readable recording medium comprising a computer program comprising instructions which, when the program is executed by a computer, cause the computer to carry out a method of signing prediction-coded video data, comprising:

a) obtaining a coded video sequence comprising a set of frames including at least one intra frame which contains independently decodable image data, and at least one inter frame, which contains image data decodable by reference to at least one other frame;

b) generating a group hash of the coded video sequence by hashing the independently decodable image data and the image data;

c) generating a plurality of individual hashes of frame subsets including at least one frame by hashing the independently decodable image data and the image data derived from the frame subsets;

d) reducing a length of each of at least one of the individual hashes to a length shorter than a total length of the group hash to provide reduced lengths;

e) generating a digital signature by encrypting at least the group hash and the at least one of the individual hashes with the reduced lengths; and f) providing the group hash and the at least one of the individual hashes with the reduced lengths together with the digital signature and the coded video sequence, wherein the reduced lengths comprise a set of lengths different from each other and wherein lengths of the set of lengths depend on a position of the respective frame subset in a group of pictures of the coded video sequence.

* * * * *